(12) United States Patent
Chellappa et al.

(10) Patent No.: US 8,365,688 B2
(45) Date of Patent: Feb. 5, 2013

(54) METHOD AND APPARATUS FOR REFORMATION OF FUELS AT LOW TEMPERATURES

(76) Inventors: Anand S. Chellappa, Albuquerque, NM (US); Donovan A. Pena, Albuquerque, NM (US); John K. Hughes, Albuquerque, NM (US); Duraiswamy Kandaswamy, Huntington Beach, CA (US)

(*) Notice: Subject to any disclaimer, the term of this patent is extended or adjusted under 35 U.S.C. 154(b) by 217 days.

(21) Appl. No.: 12/678,069

(22) PCT Filed: Sep. 12, 2008

(86) PCT No.: PCT/US2008/076309
§ 371 (c)(1), (2), (4) Date: Jul. 8, 2010

(87) PCT Pub. No.: WO2009/036386
PCT Pub. Date: Mar. 19, 2009

(65) Prior Publication Data
US 2010/0282188 A1    Nov. 11, 2010

Related U.S. Application Data

(60) Provisional application No. 60/972,182, filed on Sep. 13, 2007.

(51) Int. Cl.
*F02B 43/08* (2006.01)
(52) U.S. Cl. .......... 123/3; 123/1 A; 48/197 FM; 422/198
(58) Field of Classification Search ............... 123/1 A, 123/3, 2; 48/197 FM; 422/198
See application file for complete search history.

(56) References Cited

U.S. PATENT DOCUMENTS

| | | | | |
|---|---|---|---|---|
| 2,619,415 A | * | 11/1952 | Hemminger | 48/202 |
| 2,619,451 A | * | 11/1952 | Rex et al. | 201/31 |
| 2,762,782 A | * | 9/1956 | Gladrow et al. | 502/439 |
| 4,273,560 A | * | 6/1981 | Kostka | 48/212 |
| 4,659,634 A | * | 4/1987 | Struthers | 429/414 |
| 6,293,979 B1 | * | 9/2001 | Choudhary et al. | 48/198.7 |
| 2002/0121461 A1 | | 9/2002 | Ueda et al. | |
| 2002/0168308 A1 | | 11/2002 | Loffler et al. | |
| 2004/0137288 A1 | * | 7/2004 | Morgenstern | 429/17 |
| 2004/0175317 A1 | * | 9/2004 | Yang et al. | 423/247 |
| 2008/0010993 A1 | * | 1/2008 | Morgenstern | 60/780 |

FOREIGN PATENT DOCUMENTS

| | | | |
|---|---|---|---|
| JP | 06024702 A | | 2/1994 |
| JP | 2001221109 A | * | 8/2001 |
| JP | 16292261 A | | 10/2004 |

OTHER PUBLICATIONS

Written Opinion of the International Search Authority.

* cited by examiner

*Primary Examiner* — Noah Kamen
*Assistant Examiner* — Long T Tran
(74) *Attorney, Agent, or Firm* — Baker Hostetler, LLP

(57) ABSTRACT

A method and reactor suitable for reformation of fuels at low temperatures is disclosed. The method includes introducing an oxidized porous metal felts with a catalyst powder in a reaction chamber having a heat exchange relationship with a heat-providing chamber, vaporizing a liquid mixture of alcohol and water using an Inconel tubing, and introducing the vaporized liquid into the reaction chamber for producing a methane gas. The fuel reforming reactor includes a heat-providing chamber in a heat exchange relationship with at least one reaction chamber. Each reaction chamber having an aluminum shim lining on at least one interior surface. Each reaction chamber accommodating a catalyst powder and an oxidized porous metal felt. The catalyst powder loaded onto the oxidized porous metal felt to facilitate production of methane gas from alcohol for use with the internal combustion engine.

5 Claims, 13 Drawing Sheets

Schematic diagram of the MesoChannel reactor. Thermocouples 6,5,9,8 and 3,4,10,11 are skin thermocouples

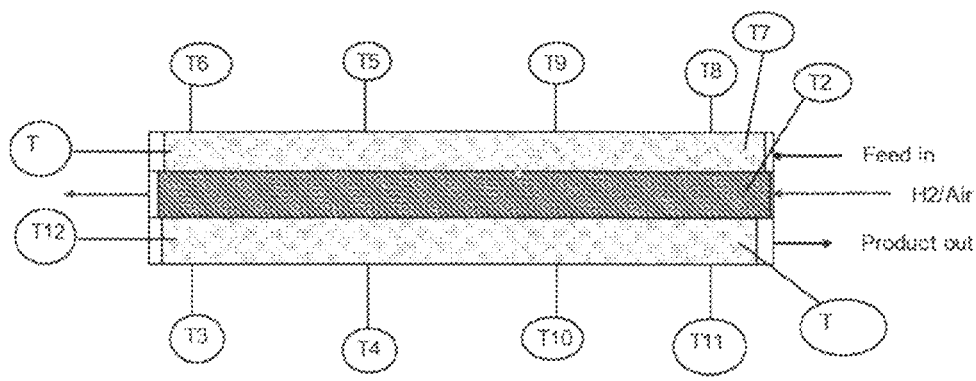
Figure 1. Schematic diagram of the MesoChannel reactor. Thermocouples 6,5,9,8 and 3,4,10,11 are skin thermocouples
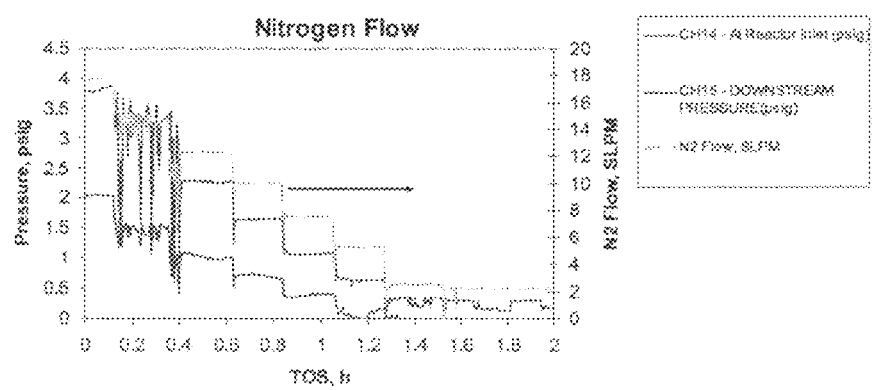
Figure 2. Reactor pressure profiles as a function of nitrogen flow. See Figures 3 and 4 for Temperature profiles.

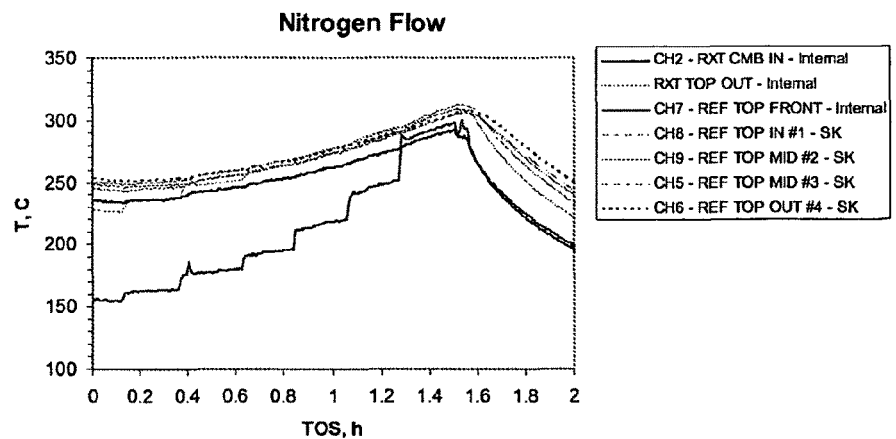
Figure 3. Reactor temperature profiles during the course of the test. Heat of combustion = 300 W during the course of this test.
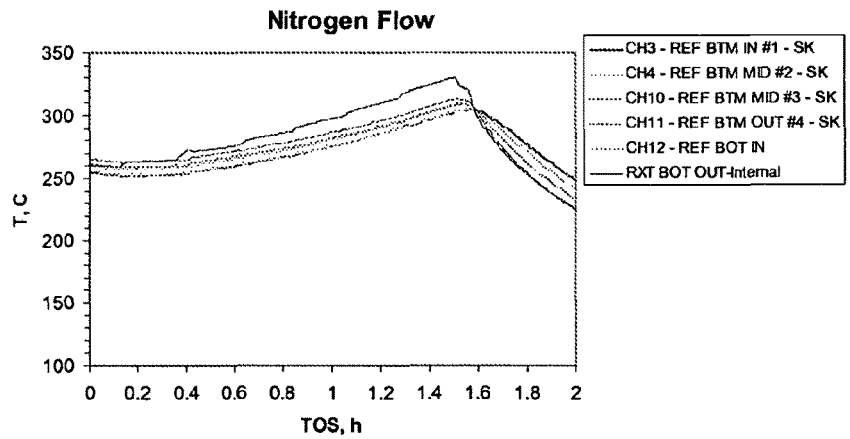
Figure 4. Reactor temperature profiles during the course of the test. Heat of combustion = 300 W during the course of this test.

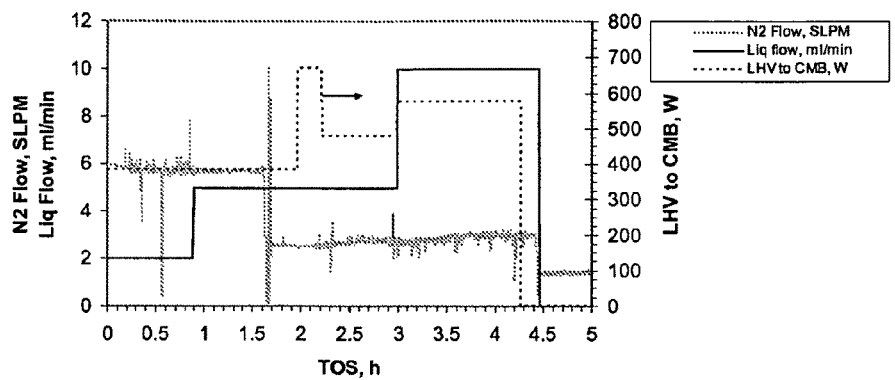
Figure 5. Profiles of liquid and gas flow rates and heat of combustion.
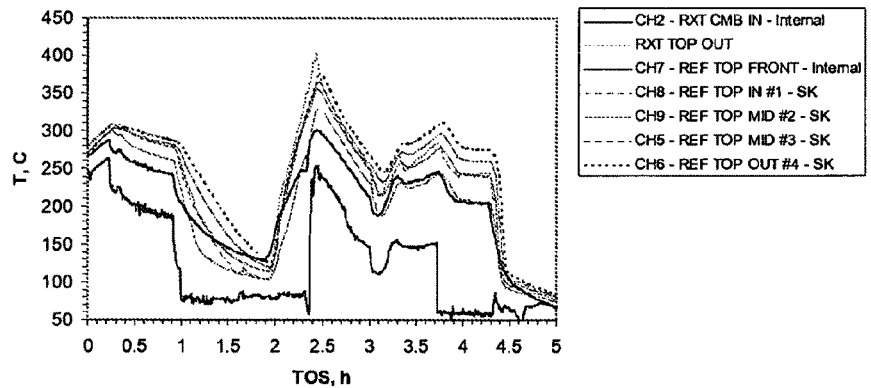
Figure 6. Reactor temperature profiles. See Figure 5 for changes in flow rates and heat of combustion.

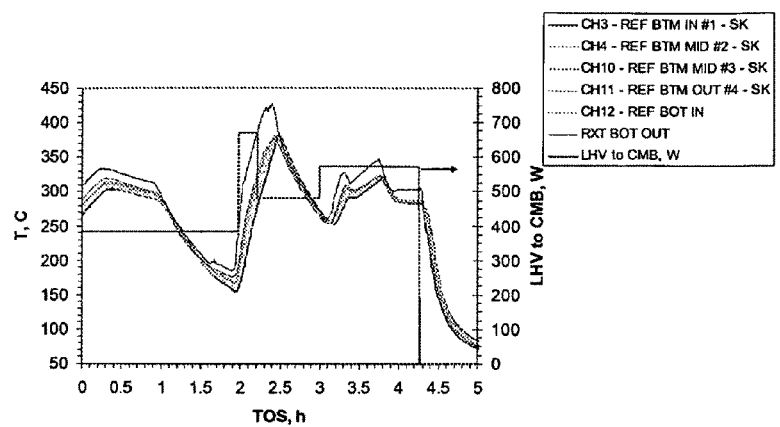
Figure 7. Reactor temperature profiles. See Figure 5 for changes in flow rates and heat of combustion.
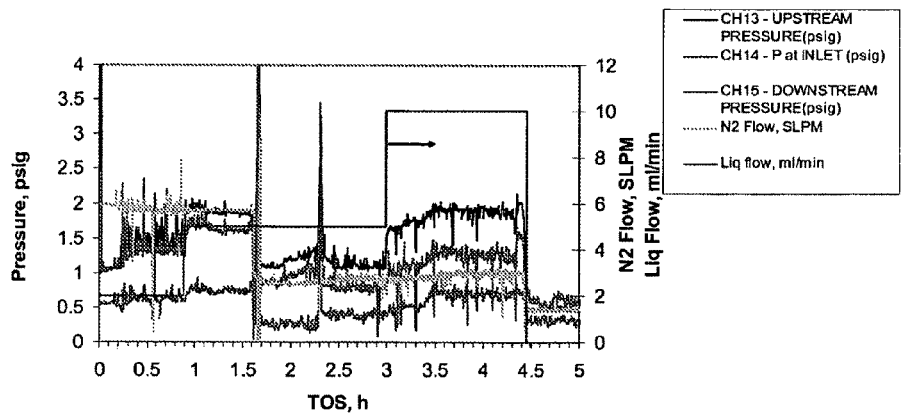
Figure 8. Reactor flow and pressure profiles.

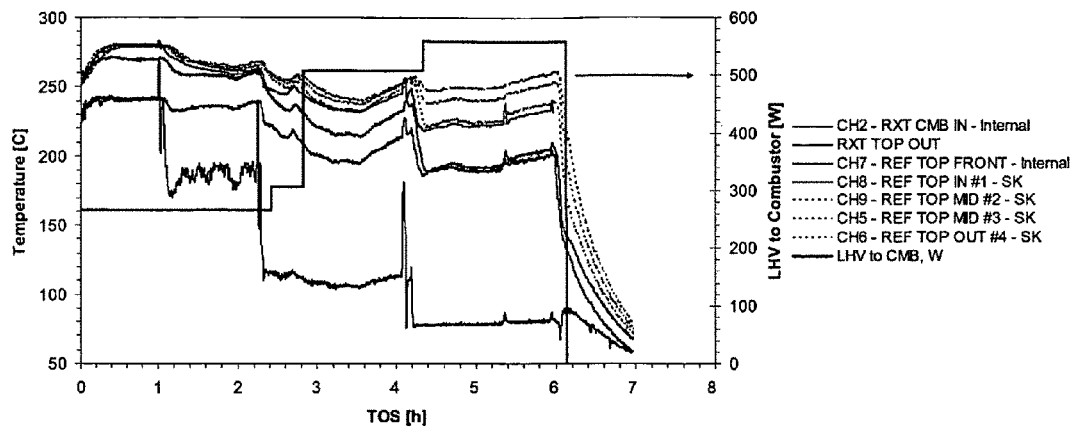
Figure 9. Temperature profiles of the combustor and top reformer chamber.
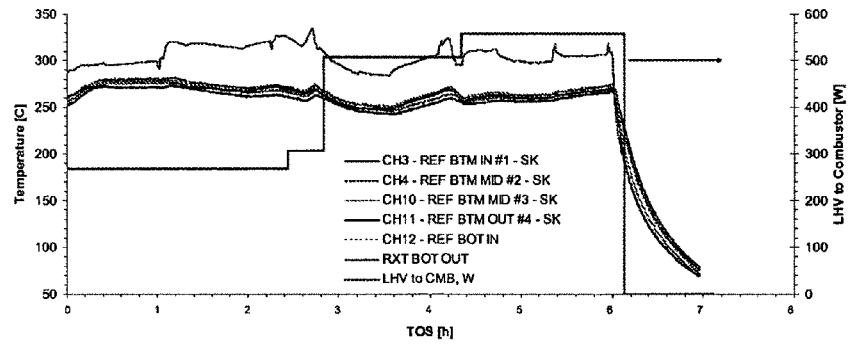
Figure 10. Temperature profiles of the bottom reformer chamber

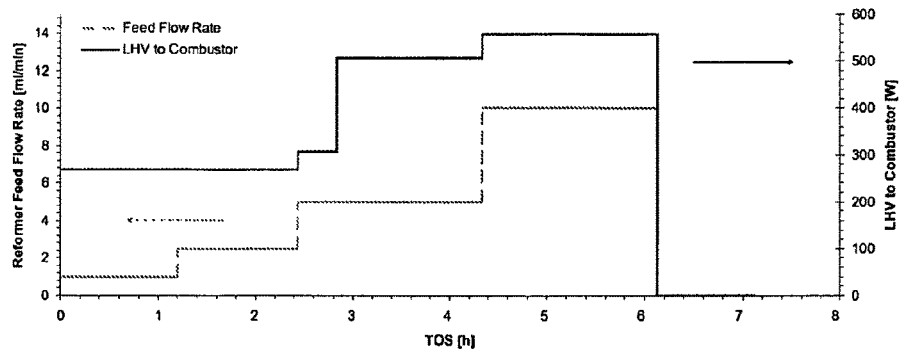
Figure 11. Reformer feed flow rate and LHV of fuel(s) fed to the combustor during the experiment.
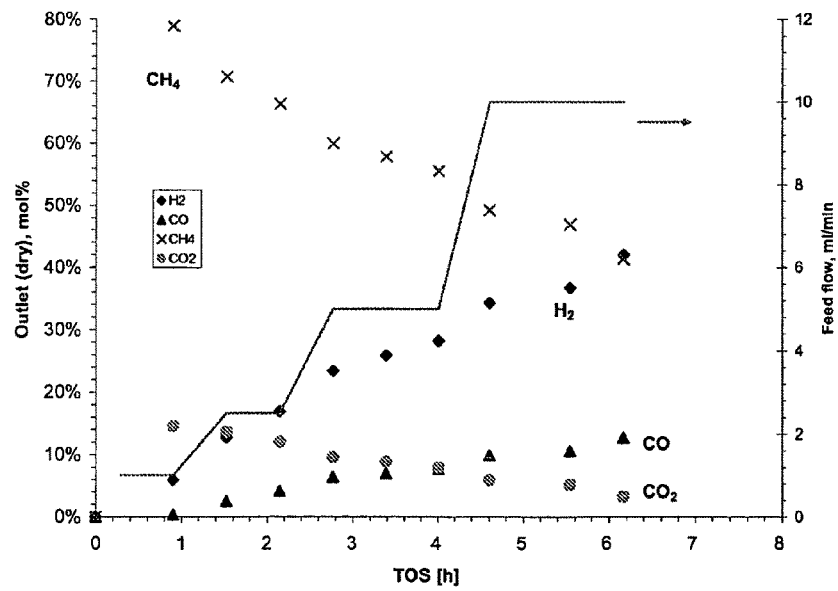
Figure 12. Reformate gas composition (dry) as a function of TOS and flow rate.

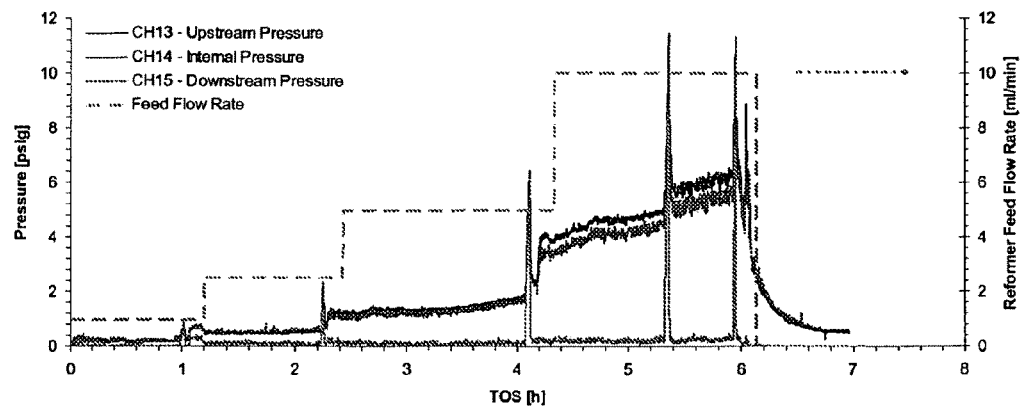
Figure 13. Pressures measured over the course of the test.
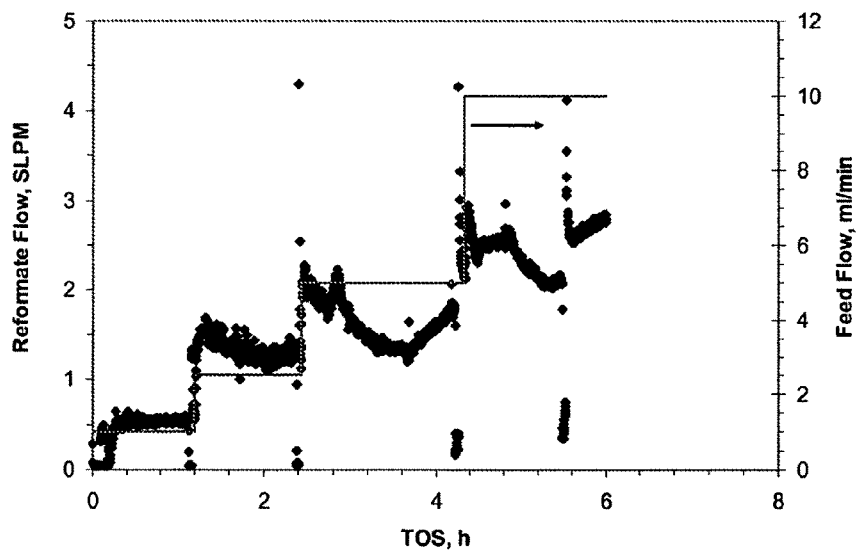
Figure 14. Reformate flow rates and feed flow rates as a function of TOS.

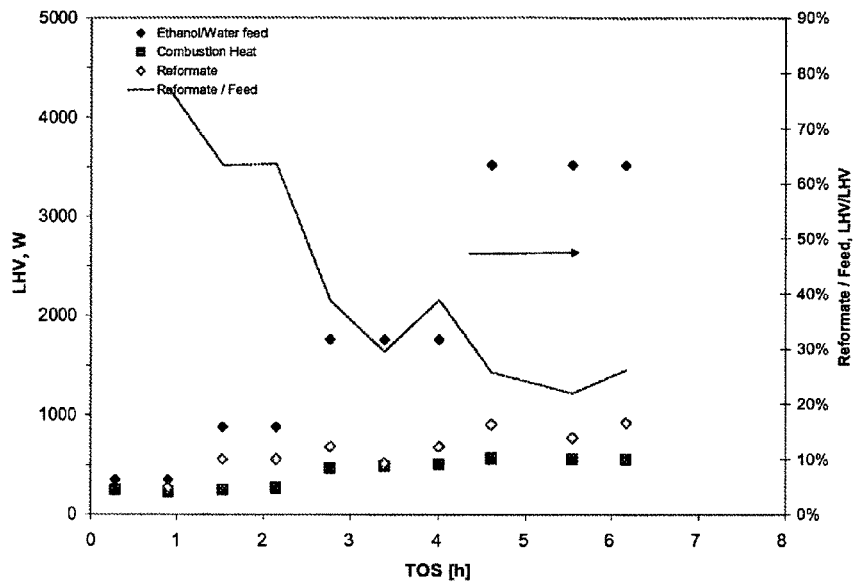
Figure 15. Heating Values (LHV) of the reactor feed, combustion feed and reformate product streams
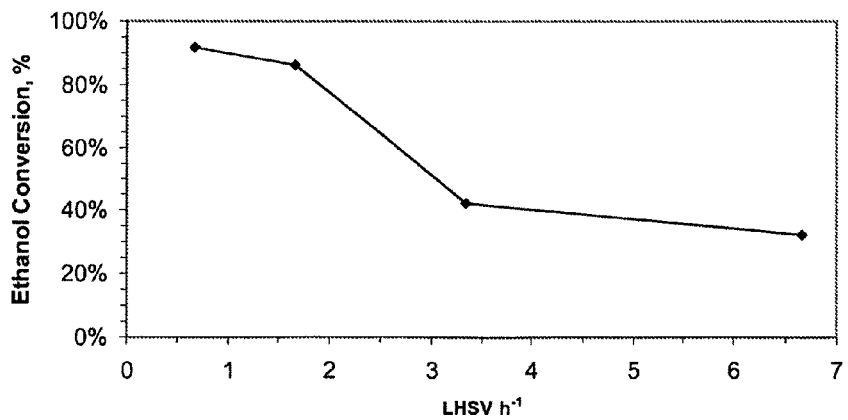
Figure 16. Ethanol conversion as a function of LHSV. Reactor volume = 90 cc (empty volume).

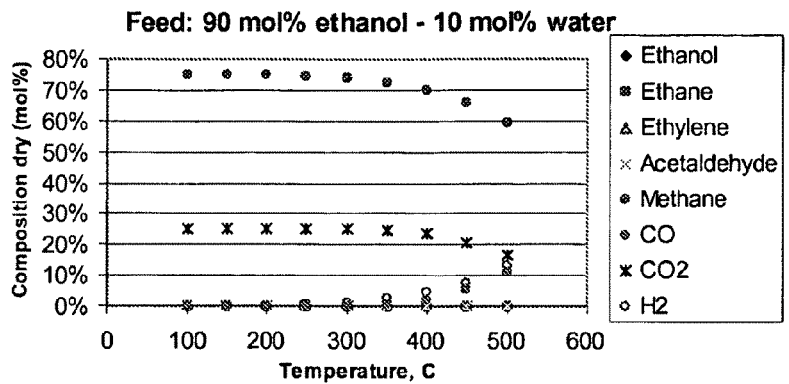
Figure 17. Equilibrium compositions at 1 bar. 96.6 vol.-% ethanol/water mixture.
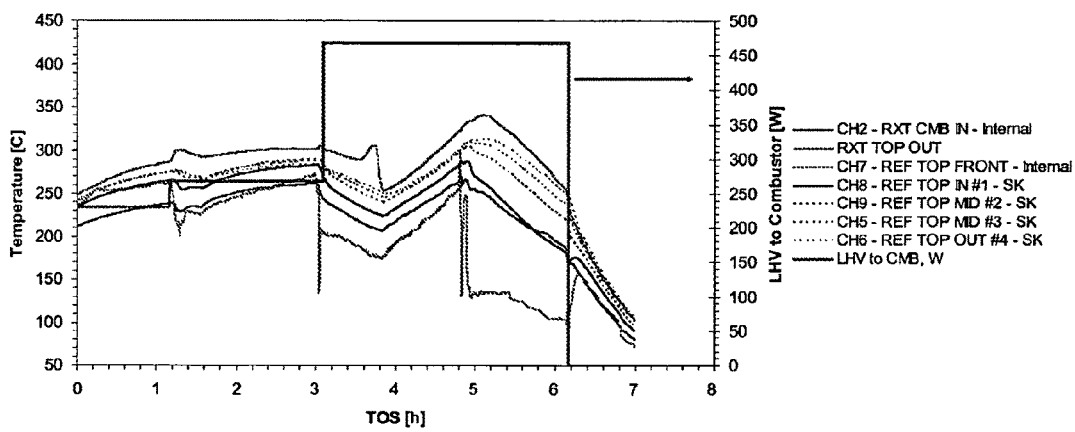
Figure 18. Temperature profiles of the combustor and top reformer chamber.

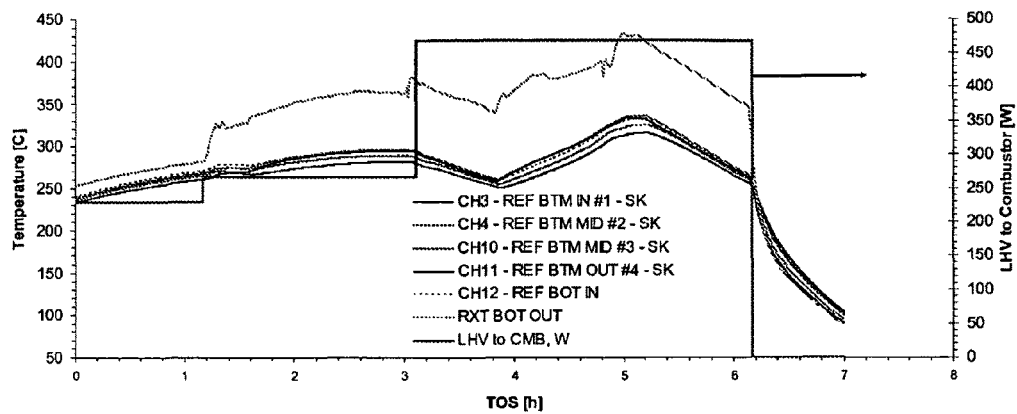
Figure 19. Temperature profiles of the bottom reformer chamber
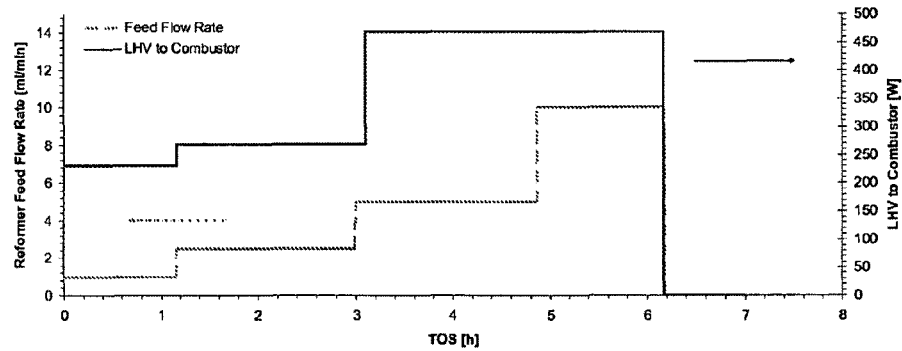
Figure 20. Reformer feed flow rate and LHV of fuel(s) fed to the combustor during the experiment.

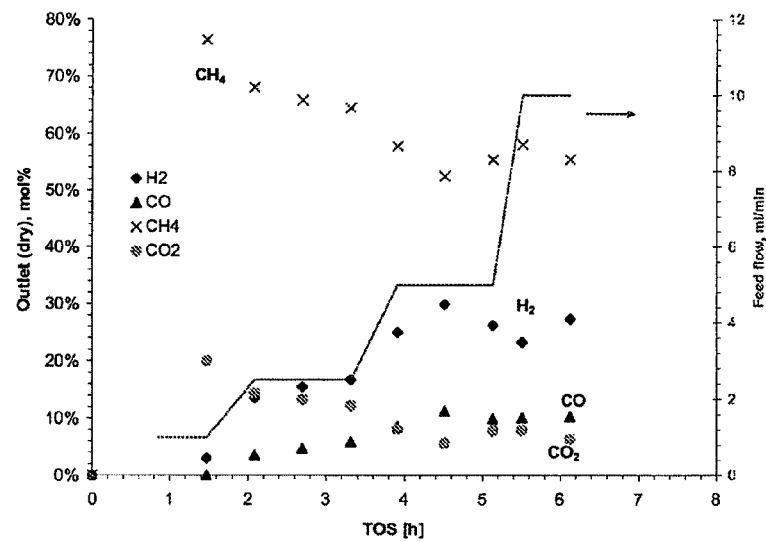
Figure 21. Reformate gas composition (dry) as a function of TOS and flow rate.
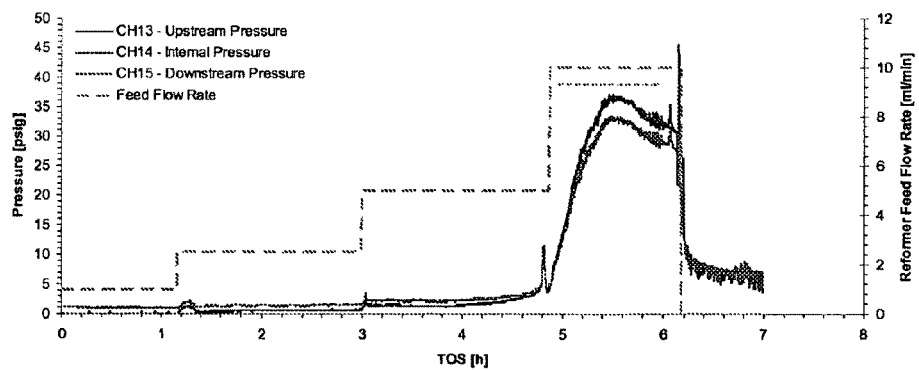
Figure 22. Pressures measured over the course of the test.

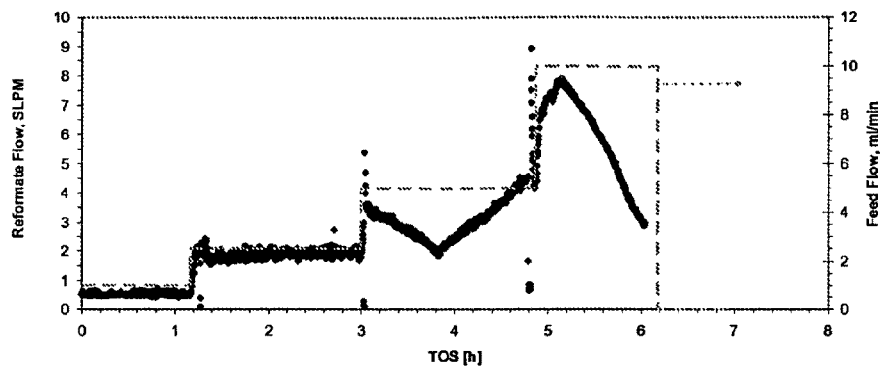
Figure 23. Reformate flow rates and feed flow rates as a function of TOS.
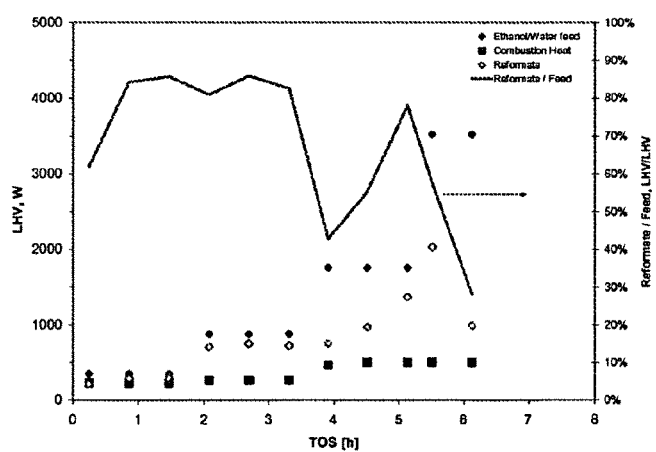
Figure 24. Heating Values (LHV) of the reactor feed, combustion feed and reformate product streams

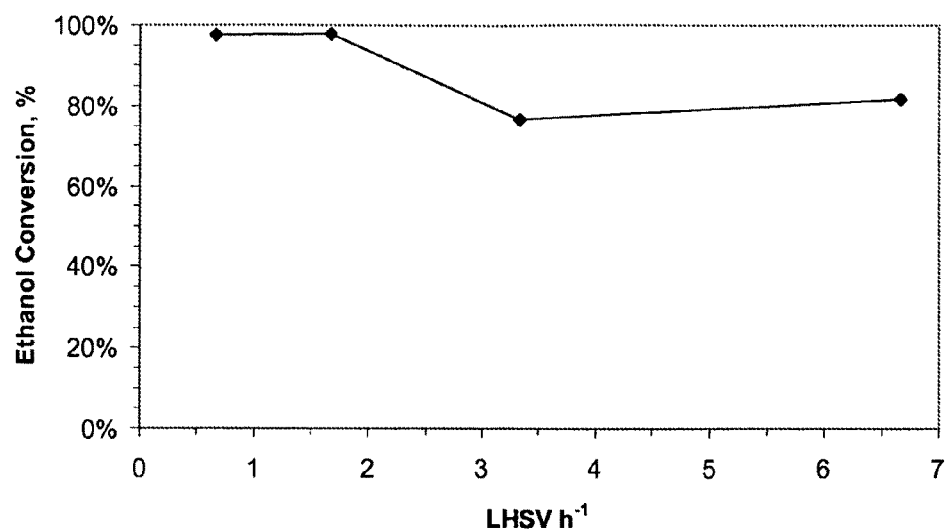
Figure 25. Ethanol conversion as a function of LHSV. Reactor volume = 90 cc (empty volume)

ND APPARATUS FOR
METHOD AND APPARATUS FOR REFORMATION OF FUELS AT LOW TEMPERATURES

This application is a national stage filing under 35 U.S.C. 371 of International Application PCT/US2008/076309, filed on Sep. 12, 2008, (published on Mar. 19, 2009 as WO/2009/036386), which claims priority from U.S. Application No. 60/972,182, filed Sep. 13, 2007, the entirety of each being incorporated herein by reference, as if fully set forth herein.

BACKGROUND

1. Field of the Disclosure

This disclosure describes a method and reactor suitable for reformation of fuels at low temperatures and at low reaction pressures while using fine catalyst powders.

2. Description of Related Art

Reforming reactions are endothermic in nature and cannot be easily practiced at the low exhaust gas temperatures (<400° C.) associated with internal combustion engine exhaust. A high efficiency reactor is needed to transfer the heat from the exhaust gases to the reforming reactor. U.S. Patent Application Number 2007/0028860 describes a method and apparatus for fuel reforming using the exhaust gases from internal combustion engines and high temperature combustion processes in which a fuel reforming and steam mixture is introduced into a tube bundle having a plurality of heat exchange tubes, and heat from the exhaust gases is transferred into the heat exchange tubes thereby increasing the temperature of the mixture. The heated mixture is reformed by contact with a reforming catalyst external to but proximate to the exit of the tube bundle forming a reformed fuel. Catalyst beds in the form of fluidized beds or recirculating beds are taught; these catalysts are not compact and do not lend themselves well to an internal combustion engine process train.

U.S. Pat. No. 6,508,209 (to Collier, Jan. 21, 2003) describes the utilization of waste heat from an internal combustion engine for reforming of fuels. Natural gas and/or propane is fed into a reforming reactor for the purpose of converting or reforming a portion thereof to a gas containing methane and/or propane, steam, nitrogen, carbon dioxide, hydrogen and carbon monoxide. This gas is mixed with air and fed to the internal combustion engine. A catalyst bed is contained between two concentric cylinders, and the fuel, water and air are introduced to the catalyst bed. The engine exhaust gas is introduced to the smaller cylinder and is used for pre-heating the fuel and water and the catalyst bed for the purpose of reforming the fuel. The catalyst is coated on raschig rings or on a monolith comprised of cordierite. The preferred catalyst is nickel. A reformer containing such catalysts may lend itself well to large scale stationary applications, but is handicapped by poor heat transfer and catalyst flake-off.

U.S. Patent Application Number 2004/0137288 (filed Oct. 16, 2003; Morgenstern) teaches a process for reforming an alcohol that comprises of contacting an alcohol with a reforming catalyst comprising copper at the surface of the metal supporting structure or sponge in the form of a powder (20 to 65 microns in size) or pellet, which is preferably a metal sponge supporting structure comprising nickel. A catalyst in the form of a monolith produced by incorporating the catalyst onto the surface of a suitable substrate (e.g. honeycomb) is also taught. While the application describes the composition of a catalyst and a method for conducting the reformation of alcohol at temperatures below 400° C., it does not teach a reactor and method for loading the fine catalyst particles (20 to 65 microns in size) in a practical manner that can be used in the process train of an internal combustion engine. While feeding a 70 wt.-% ethanol/water mixture to a reactor containing 2 grams of copper coated (on nickel) catalyst powders at 280° C., and at a flow rate of 0.3 ml/min with 100 sccm of nitrogen diluent, the pressure inside the reactor increased from 28 psig to 80 psig. The reactor consisted of a stainless steel tubular reactor that was wrapped with a coiled heater.

What is needed is a compact reactor that can use the low sensible heat of the exhaust gases to convert a fuel or a portion thereof to a gas mixture consisting of methane, carbon oxide and hydrogen. Preferably, the fuel should be lean in steam so as to reduce the endothermicity (heat requirement) of the reforming reaction. As is known to those skilled in the art, carbon deposition (coke formation) is a problem when fuels that are lean in steam are reformed. The reactor and catalysts and the method adopted for reforming should therefore mitigate or prevent coke formation. Since the exhaust gases exit the engine at low pressure, the reforming reactor and associated components (catalysts, fittings, etc.) should not introduce pressure into the internal combustion engine while operating over a wide range of fuel feed rates. Furthermore, the reactor and reactor components should be low in cost. Finally, the reactor should be capable of acceptable catalysts in the forms of powders, pellets, coated porous supports such as metal or ceramic foams or monoliths or coatings on the surfaces of the reactor.

The use of catalysts in the pellet form is a reliable, low-cost, but less efficient approach. These catalysts are suitable for use in processes where reactor size is not a critical parameter (e.g. refineries, process plants). Reactors containing catalyst pellets are not suitable for on-board reforming for the ICE application.

The use of catalyst powders (<100 microns in size) can be considered to be an approach that yields a compromise between the high efficiency of wash-coated catalysts and the low-cost of the pelletized catalysts. However, loading fine powder material directly into the reaction chambers results in an undesirable pressure drop when the packed reaction chambers are exposed to fluid flow. This is due to agglomeration of the fine particles. The ICE train is a low pressure train, and therefore a reformer that leads to high pressure drop (>5 psig) or high inlet pressures (>5 psig) would not be a good fit for ICE use.

Morgenstern and Fornango (Energy Fuels, 19 (4), 1708-1716, 2005) describe the use of copper coated Raney nickel powder as a catalyst for reforming a fuel consisting of 70 vol.-% ethanol in water. While feeding fuel at a rate of 0.1 ml/minute at 265° C. over 2 grams of the catalyst packed in a reactor tube, a gas mixture rich in methane, carbon monoxide and hydrogen was produced for 400 hours in a somewhat stable fashion. The reactor pressure was 4 psig even at this low flow rate.

SUMMARY OF THE DISCLOSURE

Described here is a reactor and method that permits the use of fine metal powders whereby reformation of fuels can be realized at high heat transfer rates and at low operating pressures. While the use of a reactor of a planar geometry is described here, the catalyst incorporation method is well suited to other reactor geometries such as the tubular geometry.

BRIEF DESCRIPTION OF THE DRAWINGS

The above-mentioned features and objects of the present disclosure will become more apparent with reference to the following description taken in conjunction with the accompanying drawings wherein like reference numerals denote like elements and in which:

FIG. 1 is a schematic diagram of the MesoChannel reactor. Thermocouples 6, 5, 9, 8, and 3, 4, 10, 11 are skin thermocouples.

FIG. 2 shows reactor pressure profiles as a function of nitrogen flow.

FIG. 3 shows reactor temperature profiles during the course of the test.

FIG. 4 shows reactor temperature profiles during the course of the test.

FIG. 5 shows profiles of liquid and gas flow rates and heat of combustion.

FIG. 6 shows reactor temperature profiles.

FIG. 7 shows reactor temperature profiles.

FIG. 8 shows reactor flow and pressure profiles.

FIG. 9 shows temperature profiles of the combustor and top reformer chamber.

FIG. 10 shows temperature profiles of the bottom reformer chamber.

FIG. 11 shows reformer feed flow rate and LHV of fuel(s) fed to the combustor during the experiment.

FIG. 12 shows reformate gas composition (dry) as a function of TOS and flow rate.

FIG. 13 shows pressures measured over the course of the test.

FIG. 14 shows reformate flow rates and feed flow rates as a function of TOS.

FIG. 15 shows Heating Values (LHV) of the reactor feed, combustion feed and reformate product streams.

FIG. 16 shows ethanol conversion as a function of LHSV.

FIG. 17 shows equilibrium compositions at 1 bar. 96.6 vol.-% ethanol/water mixture.

FIG. 18 shows temperature profiles of the combustor and top reformer chamber.

FIG. 19 shows temperature profiles of the bottom reformer chamber.

FIG. 20 shows reformer feed flow rate and LHV of fuel(s) fed to the combustor during the experiment.

FIG. 21 shows reformate gas composition (dry) as a function of TOS and flow rate.

FIG. 22 shows pressures measured over the course of the test.

FIG. 23 shows reformate flow rates and feed flow rates as a function of TOS.

FIG. 24 shows Heating Values (LHV) of the reactor feed, combustion feed and reformate product streams.

FIG. 25 shows ethanol conversion as a function of LHSV.

DETAILED DESCRIPTION

A planar reactor constructed of Stainless Steel 304 is described for reforming 96.6 vol.-% ethanol (ACS reagent grade) –3.4 vol.-% water (distilled water) feed. The reactor consists of two reaction chambers of nominal dimensions 4 cm×11 cm×1 cm that enjoyed a heat exchange relationship with a catalytic combustion chamber that was sandwiched between the two reaction chambers. The empty volume of the two reaction chambers is about 90 cc. The two reaction chambers are also in fluid communication with each other using an internal loop, whereby feed entry and product removal are accomplished from the same side of the reactor. A schematic diagram of this reactor, which also shows the position of the thermocouples that were used during testing, is shown in FIG. 1.

A suitable catalyst is loaded into the reaction chambers to accomplish the production of a methane rich gas stream from alcohols for use in internal combustion engines (ICE). When used for ICE applications, the combustion chamber could take the form of a heat providing chamber wherein, heat to the reaction chambers is provided by the flow of hot engine exhaust gases into the heat providing chamber.

The catalysts can be wash-coated on to porous metal or ceramic supports or monoliths and these supports can be inserted into the reaction chambers; the chambers may contain fins or other features to provide for uniform gas distribution, and for effective heat transfer between the combustion chamber and the reaction chambers. The catalysts can also be coated on to the surfaces of the reaction chambers. U.S. Pat. No. 7,220,699 granted to us describes an exemplary planar reactor for incorporation of catalyst coated metal strips. Our U.S. patent application Ser. No. 10/712,208 teaches catalyst deposition using cold spray wherein a reactor contains fine catalyst powders (e.g. 4-8 micron sized nickel powders as sold by Atlantic Engineers) deposited by the cold spray method on-to metal strips; catalysts of this form may also be used for reformation of ethanol feed mixtures that are lean in water. Other coating methods (e.g. wash coating, vapor deposition) can be used to deposit nickel or other catalyst powders onto porous substrates.

We describe here a method that permits the use of fine powders (e.g. Raney® nickel 2400, Aldrich) while allowing for a low operating pressure. The fine powders are loaded onto strips (1.6 mm thick×11 cm×1 cm) of a porous metal felt (e.g. G-mat, Micron Fiber-Tech); these porous felt strips are then tightly assembled to touch each other to form a "block", and the "block" of loaded felt strips was inserted into the reaction chambers. This arrangement provides a labyrinth of serpentine channels to insure uniform flow distribution and good heat transfer. The G-mat (nominal thickness of 3 mm) material is a light fiber mat that was developed by Micron Fiber-Tech (Debary, Fla.) for blue flame burner applications.

The powders can be loaded on to the felts in the dry form or in the slurry form; the latter is preferred to counter the pyrophoric nature of some fine particles such as Raney nickel.

If the catalyst material is in the form of dry powders, these powders can be packed into channels formed between strips of the porous metal felt. In this instance, the strips may be assembled with a space (nominal width=2 mm) in between them.

Other suitable porous metal strips (e.g. other varieties sold by Micron Fiber-Tech) or by other suppliers (e.g. FeCrAly felt as sold by Porvair) or metal wool can be used for this purpose. While the use of Raney nickel powders is discussed here, incorporation of other catalyst powders, Raney nickel or otherwise, may be accomplished using a similar method.

While the use of metal felts to prevent the agglomeration of fine particles, while providing for uniform heat and flow distribution is described, the reaction chambers may also contain catalyst coated substrates in the form of screen, meshes, foams or monoliths.

The combustion chamber contained a piece of FeCrAlY foam (60 ppi) that was coated with a precious metal catalyst formulation. The catalyst allowed for ambient temperature light-off of hydrogen/air mixtures. When used as an on-board reformer, that is, on-board a vehicle to support an internal combustion engine, heat to the reactor will be provided by heat exchange with the hot exhaust gases from the engine. In this case, the combustion chamber can be considered to be a heat-providing chamber and would preferably contain a bare metal foam or other features to facilitate transfer of heat to the reaction chambers.

The reactor that contains fine catalyst powders in the wet or dry state or in a deposited state that is suitable to generate a methane rich gas (reformate gas) from alcohols such as ethanol, could also be used as a low temperature pre-reformer in a hydrogen generation process scheme.

A piece of Inconel tubing is simply wound around the external wall of the combustion chamber to vaporize and pre-heat any liquid prior to feeding into the reactor. Other methods for fuel vaporization could also be employed. If needed during laboratory testing, a gas such as nitrogen gas can be added to the vaporized liquid, and the gas-liquid mixture is then fed into the reactor. A heat exchanger can also be used to pre-heat the fuel feed by heat exchange with the exiting reformate gas.

The catalyst-containing reactor described here is substantially different from that taught in U.S. Pat. No. 5,928,614 (Jul. 27, 1999). That reactor, which was intended for automobile applications, contained serially arranged reactor stages consisting of three stages, a gas permeable wall, and a heating device wherein, the reactor stages contained catalyst pellets.

The catalyst-containing reactor described here is substantially different from that taught in U.S. Pat. No. 5,935,277 (Aug. 10, 1999). That reactor contained a reaction space filled with catalyst pellets and a movable reaction space wall which exerts a position-fixing pressure onto the catalyst pellet bed.

Scale-up of the reactor described herein can be easily achieved by using a multiplicity of reaction chambers and heat providing chambers or by increasing the reaction chamber volume and heat providing chamber volume. The reaction chambers need not be in fluid communication with each other when the fuel is separately fed into each reach chamber.

EXAMPLE 1

G-mat felt pieces were sized and oxidized in air at 800° C. for about 12 hours. The mats were then cooled to ambient temperature and weighed. They were then soaked in water, weighed and loaded into the reactor as shown in FIG. 1. The surfaces of the reactor were lined with aluminum shim (0.05 mm thick). The felt pieces were soaked in water to determine the amount of water that can be absorbed by the empty volume of the porous felts. The water loading was found to be 69%. The reactor was installed in a test bench that contained necessary instrumentation (thermocouples, pressure transducers, pressure gauges, mass flow controllers, a mass flow meter situated in the exit line of the reactor, liquid feed pump, etc.) to characterize the behavior of the reactor, a data acquisition system and a Shimadzu GC 14 gas chromatograph (for analysis of the reactor outlet gas when needed). A chiller and liquid condensate collector was also installed downstream of the reactor to condense and collect any liquid exiting the reactor for analysis.

Heat was introduced into the reaction chambers by the catalytic combustion of hydrogen that was conducted in the combustion chamber. The heat of combustion (LHV) was held constant at about 300 W during the course of this test. Nitrogen gas was fed to the reaction chamber at different flow rates to assess the pressure drop across the reactor as a function of flow rates. FIG. 2 shows the pressure profiles at the reactor inlet, and at a point downstream of the reactor when the nitrogen flow rate was varied from 18 SLPM to 2 SLPM. As can be seen, the maximum pressure drop was less than 2 psig at 18 SLPM and about 0.5 psig at 2 SLPM. The maximum inlet pressure was less that 5 psig. FIGS. 3 and 4 show the temperature profiles of the reactor during this test.

EXAMPLE 2

After the test described in Example 1, the reactor was exposed to a mixture of nitrogen-water, and then to a mixture of nitrogen-ethanol/water. The liquid was pre-heated using a piece of Inconel tubing that was simply wound around the external wall of the combustion chamber. Nitrogen gas was added to the vaporized liquid, and the gas-liquid mixture was then fed into the reactor.

Water feed was replaced with 96.6 vol.-% ethanol (ACS reagent grade) −3.4 vol.-% water (distilled water) feed at 2.22 hours (X-axis). At 4.26 hours, the ethanol/water feed was replaced with water feed. Liquid flow was stopped at 4.46 hours. The liquid and gas flow rate profiles, along with the profile of the heat of combustion (LHV) supplied by the combustion chamber are shown in FIG. 5. Hydrogen gas or a mixture of hydrogen and propane was catalytically combusted in the combustion chamber. FIGS. 6 and 7 show the temperature profiles during the course of this test.

As shown in FIG. 8, while the liquid flow rate was changed from 5 ml/minutes to 10 ml/minutes, the maximum pressure drop was about 1 psig. The inlet pressure was less than 2 psig.

The reactor exit stream was routed to a condenser/chiller and the dry gas was analyzed using the gas chromatograph. As shown in Table 1, the gas contained about 9% methane when the liquid feed rate was 5 ml/minute; a 10× decrease in methane was noticed when the feed rate was increased to 10 ml/minute. However, note that the temperature also underwent some changes between the times when these two samples were collected. This result points to negligible activity of the reactor materials at temperatures below 300° C. The high methane levels at 5 ml/minute is probably due to the upward temperature excursion between 2 and 3 hours (TOS). The reactor was cooled to ambient temperature and was opened and inspected for coke formation. No coke formation was observed.

EXAMPLE 3

G-mat felt pieces were sized and oxidized in air at 800° C. for about 12 hours. The felt pieces were soaked in water and the wet felts were placed on a roller mill in a container with Raney® Nickel 2400 (Sigma-Aldrich, Table 2) for about 30 hours. The metal felts were then loaded into the reactor as described in Examples 1 and 2. The nickel loading, estimated by weight difference, was about 77 grams.

The reactor containing the nickel-loaded felt strips was insulated and assembled on the test-bench. Heat was generated in the combustion chamber as described in Examples 1 and 2.

Room temperature light-off was accomplished using a 6 vol.-% $H_2$ in air mixture with a heating value of 310 W (LHV). The feed to the combustor was changed with change in ethanol/water feed rates during the test to maintain the reformer temperature at 250° C. to 300° C.

A mixture consisting of 85 vol.-% N2/15 vol.-% water (water was vaporized prior to mixing with nitrogen) was fed to the reaction chambers at ambient temperature as the reactor was heated. At 1.9 hours into the test (TOS=0 hours in Figures related to this example), the feed was replaced with 1 ml/minute of 96 vol.-% ethanol/water mixture. The temperature profiles at various points of the reactor, the changes in feed flow rates that were made during the course of this test, and the gaseous product composition are shown in FIGS. 9 and 10, 11 and 12 respectively. The product stream exiting the reactor (FIG. 1) was routed to a chilled condenser; the flow rate and composition of the dry gas were then measured.

FIG. 13 shows the pressure profiles upstream and downstream of the reformer as feed flow rates were changed (see FIG. 11).

The reactor was shut down by replacing the ethanol-water feed with a water-nitrogen feed after stopping hydrogen supply to the combustion chamber. Feed to the reaction chamber was stopped when the temperatures reached 25° C.

As shown in FIGS. 9 and 10, the "top reaction chamber" temperatures ranged between 200 to 250° C. (other than the internal IN temperature), and the "bottom reaction chamber" temperatures were at 250 to 260° C. while the feed rate was changed from 1 to 10 ml/minute. FIGS. 9 and 10 show the changes in the heat of combustion that was required to achieve these reaction temperature profiles. The temperature profile shows that pre-heating of the feed could to be improved, particularly at the higher flow rates. The temperature spikes of the top reaction chamber inlet thermocouple are an artifact of switching valves that were activated to collect condensate during the course of the test.

The exit temperature of the bottom reaction chamber (FIG. 10) was noticeably warmer than the other temperatures (300° C.). Since the target was to maintain all temperatures below 300° C., we did not attempt to increase the temperature at other points to achieve better conversions to avoid exceeding the temperature target at the exit of the bottom reaction chamber.

FIG. 12 shows the composition of the reformate stream (dry) that was produced during this test. The $H_2$ and CO content increased linearly with increase in feed rates (space velocities), while the $CH_4$ and $CO_2$ contents decreased. This suggests that lower conversion levels (higher feed flow rates) result in higher hydrogen and carbon monoxide levels. The extent of the methanation reaction may also be an influencing factor. At the end of the test at a fuel flow rate of 10 ml/min, the reformate stream consisted of 42% $CH_4$, 42% $H_2$, 12% CO, and 4% $CO_2$.

The change in composition at a fixed feed rate is likely due to the volume of the system components (knock-out pots) that are installed downstream of the reactor.

No evidence of coking was found upon inspection of the reactor after the test; however, the top reformer appeared to have less catalyst than when it was assembled. The gradual increase in upstream and internal pressures (FIG. 13) is probably due to the migration of the catalyst slurry to a single location. The spikes in pressure (FIG. 13) immediately before changes in the feed flow rate are an artifact of the switching valves that were used to drain the condensate from the system.

FIG. 14 shows the reformate flow rates and pressures measured during the test. As shown in FIG. 15, the heating value of the reformate stream does not mirror the step change that can be expected with a step change in feed flow if ethanol conversion was constant. As a fraction of the heating value of the feed, the heating value of the reformate stream varies from a high of 55% at the lower feed rates to about 25% at the higher feed rates. This result indicates that liquid conversion decreases with increase in feed rates over the commercial Raney nickel catalyst at 250 to 300° C. Conversions may also be influenced by the dislodging of the catalyst particles.

The liquid condensate was collected prior to a change in the feed flow rate and was weighed. Assuming that the liquid was a mixture of un-reacted ethanol and water, the ethanol content in the condensate was estimated by density measurements (a calibration curve using ethanol-water mixtures was calculated previously). The conversion of ethanol was then calculated was found to vary between 92% at 1 ml/minute and 32% at 10 ml/minute (FIG. 16). C, H, and O balances closed within 15%. No evidence of coking was found upon inspection of the reactor after the test.

On comparing the measured gas compositions (FIG. 12) with the equilibrium compositions (FIG. 17), it is clear that the reaction is at near equilibrium at the lower feed rates used during this test.

EXAMPLE 4

G-mat felt pieces were sized and oxidized in air at 800° C. for about 12 hours. The felt pieces were soaked in water and the wet felts were placed in bags containing Raney® Nickel 2400 (Sigma-Aldrich, Table 2) before being placed inside of a container on a roller mill for about 1.5 hours. The metal felts were then loaded into the reactor as described in Examples 1 and 2, but 6 metal felts were placed perpendicular to the flow at the front, middle, and back of each reformer chamber. The nickel loading, estimated by weight difference, was about 43 grams.

The reactor containing the nickel-loaded felt strips was insulated and assembled on the test-bench. Heat was generated in the combustion chamber as described in Examples 1 and 2.

Room temperature light-off was accomplished using a 4.1 vol.-% $H_2$ in air mixture with a heating value of 230 W (LHV). The feed to the combustor was changed with change in ethanol/water feed rates during the test to maintain the reformer temperature at 275° C. to 350° C.

A mixture consisting of 85 vol.-% N2/15 vol.-% water (water was vaporized prior to mixing) was fed to the reaction chambers at ambient temperature as the reactor was heated. At 3.75 hours into the test (TOS=0 hours in Figures related to this example), the feed was replaced with 1 ml/minute of 96 vol.-% ethanol/water mixture. The temperature profiles at various points of the reactor, the changes in feed flow rates that were made during the course of this test, and the gaseous product composition are shown in FIGS. 18 and 19, 20 and 21 respectively. The product stream exiting the reactor (FIG. 1) was routed to a chilled condenser; the flow rate and composition of the dry gas were then measured.

FIG. 22 shows the pressure profiles upstream and downstream of the reformer as feed flow rates were changed (see FIG. 20).

The reactor was shut-down by replacing the ethanol-water feed with a water-nitrogen feed after stopping hydrogen supply to the combustion chamber. Feed to the reaction chamber was stopped when the temperatures reached 35° C.

As shown in FIGS. 18 and 19, the "top reaction chamber" temperatures ranged between 200 to 350° C. (other than the internal IN temperature), and the "bottom reaction chamber" temperatures were at 300 to 425° C. while the feed rate was changed from 1 to 10 ml/minute. FIGS. 18 and 19 show the changes in the heat of combustion that was required to achieve these reaction temperature profiles. The temperature profile shows that pre-heating of the feed could to be improved, particularly at the higher flow rates. The temperature spikes of the top reaction chamber inlet thermocouple are an artifact of switching valves that were activated to collect condensate during the course of the test.

The exit temperature of the bottom reaction chamber (FIG. 19) was noticeably warmer than the other temperatures (300-425° C.). This temperature difference was more pronounced in this run compared to the previous tests.

FIG. 21 shows the composition of the reformate stream (dry) that was produced during this test. The $H_2$ and CO content increased in an approximately stepwise manner with increases in feed rates (space velocities), while the $CH_4$ and $CO_2$ contents decreased. At the end of the test at a fuel flow rate of 10 ml/minute, the reformate consisted of 55% $CH_4$, 27% $H_2$, 10% CO, and 6% $CO_2$.

The spikes in pressure (FIG. 22) immediately before changes in the feed flow rate are an artifact of the switching valves that were used to drain the condensate from the system.

FIG. 23 shows the reformate flow rates and pressures measured during the test. As a fraction of the heating value of the feed, the heating value of the reformate stream varies from a high of 85% at the lower feed rates to about 25% at the higher feed rates (FIG. 24).

The liquid condensate was collected prior to a change in the feed flow rate and was weighed. Assuming that the liquid was a mixture of un-reacted ethanol and water, the ethanol content in the condensate was estimated by density measurements. The conversion of ethanol was then calculated and was found to vary between 98% at 1 ml/minute and 82% at 10 ml/minute (FIG. 25). C, H, and O balances closed within 25%. Inspection of the reactor insides after the test revealed some coke formation at the exit end of the bottom reformer chamber. As shown in FIG. 19, the temperature at this region of the reformer chamber exceeded 400° C. However, in contrast to Example 3, negligible dislocation of the catalyst particles inside both reaction chambers was observed.

EXAMPLE 5

The reactor described in the previous examples was used for reformation of a 96.6 vol.-% ethanol/water mixture, but with the following changes: (1) the felt pieces were not oxidized prior to loading with the nickel particles, (2) the reaction chamber surfaces were not lined with aluminum shim and (3) a SS304 tubing instead of Inconel tubing was used as the fuel vaporizer. The nickel loading was estimated to be 26 grams. The reaction chamber temperatures were between 350° C. and 400° C. While following a similar test procedure as described in previous examples, the reactor pressure increased dramatically during the course of the test. Inspection of the reaction chambers after the test revealed severe coke formation.

TABLE 1

Composition of reactor exit gas (dry) during nitrogen-ethanol/water feed.

| TOS, h | Liquid flow rate, ml/min | $H_2$ | $N_2$ | CO | $CH_4$ | $CO_2$ |
|---|---|---|---|---|---|---|
| 2.96 | 5 | 0.27 | 89.17 | 0.09 | 8.83 | 1.64 |
| 3.64 | 10 | 0.17 | 96.89 | 0.05 | 2.43 | 0.46 |
| 4.24 | 10 | 0.13 | 98.87 | 0.03 | 0.81 | 0.16 |

TABLE 2

Properties of Raney Nickel.

| Description | Raney 2400 | Raney 4200 |
|---|---|---|
| Nickel | >81.0% | >93% |
| Aluminum | 6.0-13.0% | <6.5% |
| Iron | 2.0-3.0% | <0.8% |
| Chromium | 2.0-3.0% | — |
| Molybdenum | — | — |
| Particle Size, microns | 25-55 | 20-50 |
| pH of water | 8.5-12.5 | 8.5-11.0 |
| Specific Gravity of Metal | Approx. 7 | Approx. 7 |
| Bulk density (lbs/gal) | 15-17 | 15-17 |
| Solubility in Water | Insoluble | Insoluble |

The invention claimed is:

1. A method for reforming a fuel at low temperature, the method comprising:
    oxidizing porous metal felts in air at a temperature of at least about 800° C. for about 12 hours;
    cooling the oxidized porous metal felts to ambient temperature;
    introducing the oxidized porous metal felts with a catalyst powder in a reaction chamber wherein
    the catalyst powder is introduced by applying a cold spray of the catalyst powder to at least one surface of the reaction chamber;
    having a heat exchange relationship with a heat-providing chamber;
    vaporizing a liquid mixture of alcohol and water using an Inconel tubing; and,
    introducing the vaporized liquid into the reaction chamber for producing a methane gas.

2. A method for reforming a fuel at low temperature, the method comprising:
    oxidizing porous metal felts in air at a temperature of at least about 800° C. for about 12 hours;
    cooling the oxidized porous metal felts to ambient temperature;
    introducing the oxidized porous metal felts with a catalyst powder in a reaction chamber;
    having a heat exchange relationship with a heat-providing chamber;
    vaporizing a liquid mixture of alcohol and water, wherein the water content of the liquid mixture is between 0.1 vol.-% and 15 vol.-%, using an Inconel tubing; and,
    introducing the vaporized liquid into the reaction chamber for producing a methane gas.

3. A method for reforming a fuel at low temperature, the method comprising:
    oxidizing porous metal felts in air at a temperature of at least about 800° C. for about 12 hours;
    cooling the oxidized porous metal felts to ambient temperature;
    lining a reaction chamber with an aluminum shim;
    introducing the oxidized porous metal felts with a catalyst powder in the reaction chamber having a heat exchange relationship with a heat-providing chamber;
    vaporizing a liquid mixture of alcohol and water using an Inconel tubing; and,
    introducing the vaporized liquid into the reaction chamber for producing a methane gas.

4. A method for reforming a fuel at low temperature for use in an internal combustion engine, the method comprising:
    introducing oxidized porous metal felts with a catalyst powder in a reaction chamber;
    introducing hot engine exhaust gases in the heat-providing chamber having a heat exchange relationship with the reaction chamber;
    vaporizing a liquid mixture comprising at least alcohol and water using Inconel tubing;
    introducing the vaporized liquid and a nitrogen gas into the reaction chamber for producing a methane gas;
    using the produced methane gas in the internal combustion engine; and,
    wherein the water content of the liquid mixture is between 0.1 vol.-% and 15 vol.-%.

5. A method for reforming a fuel at low temperature for use in an internal combustion engine, the method comprising:
introducing oxidized porous metal felts with a catalyst powder in a reaction chamber with at least one interior surface of the reaction chamber lined with an aluminum shim;
introducing hot engine exhaust gases in the heat-providing chamber having a heat exchange relationship with the reaction chamber;
vaporizing a liquid mixture comprising at least alcohol and water using Inconel tubing;
introducing the vaporized liquid and a nitrogen gas into the reaction chamber for producing a methane gas; and,
using the produced methane gas in the internal combustion engine.

* * * * *